United States Patent
Buchanan

[19]

[11] Patent Number: 6,140,919
[45] Date of Patent: Oct. 31, 2000

[54] AUXILIARY SIGNAL LIGHT SYSTEM

[76] Inventor: Willie B. Buchanan, 1534 Castle Downs Cove, Lithonia, Ga. 30058

[21] Appl. No.: 09/428,890

[22] Filed: Oct. 28, 1999

[51] Int. Cl.[7] .................................................. B60Q 1/26
[52] U.S. Cl. ......................... 340/468; 340/465; 340/472; 340/475
[58] Field of Search .................................. 340/468, 472, 340/475; 362/61, 72, 464, 473; 224/510, 524; 280/186, 292, 188

[56] References Cited

U.S. PATENT DOCUMENTS

| | | | |
|---|---|---|---|
| 4,800,471 | 1/1989 | Lippert | 362/485 |
| 4,949,228 | 8/1990 | Lin et al. | 362/72 |
| 5,038,983 | 8/1991 | Tomososki | 224/510 |
| 5,198,798 | 3/1993 | Lietzow et al. | 362/473 |
| 5,372,287 | 12/1994 | Deguevara | 352/496 |
| 5,434,758 | 7/1995 | Zeidler | 224/521 |
| 5,764,141 | 6/1998 | Chang | 340/479 |

*Primary Examiner*—Jeffery A. Hofsass
*Assistant Examiner*—Son Tang

[57] ABSTRACT

A auxiliary signal light system for visual enhancement of turn and brake signal lights. The auxiliary signal light system includes a housing for holding a brake light. The housing has a front face and a back face with a peripheral wall defining a periphery therebetween. The front face of the housing has a cavity therein. A brake light for signaling the braking of a motor vehicle is mounted in the well of the housing and is operatively coupled to a power source. A mounting block for mounts the housing to a rear portion of a vehicle. The mounting block has a distal wall and a proximal wall. The proximal wall of the mounting block is fixedly coupled to the back face of the housing. At least one pair of arms holds vehicle turn signals. The arms are coupled to the mounting and extend away from the mounting block. The arms extend to a point beyond the peripheral of the housing. A pair of turn signals warns of turning action of the motor vehicle. One of the turn signals is formed in the surface of each of the arms. The turn signals are operatively coupled to the power source.

5 Claims, 4 Drawing Sheets

AUXILIARY SIGNAL LIGHT SYSTEM

BACKGROUND OF THE INVENTION

1. Field of the Invention

The present invention relates to auxiliary signal lights and more particularly pertains to a new auxiliary signal light system for visual enhancement of turn and brake signal lights.

2. Description of the Prior Art

The use of auxiliary signal lights is known in the prior art. More specifically, auxiliary signal lights heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,825,191; U.S. Pat. No. 5,073,768; U.S. Pat. No. 5,566,485; U.S. Pat. No. 4,896,137; U.S. Pat. No. 2,109,565; and U.S. Pat. Des. No. 317,428, U.S. Pat. No. 2,602,115; U.S. Pat. No. 1,676,948; U.S. Pat. No. 4,631,516; U.S. Pat. Des. No. 101,107, U.S. Pat. No. 5,845,983.

While these devices fulfill their respective, particular objectives and requirements, the aforementioned patents do not disclose a new auxiliary signal light system. The inventive device includes a housing for holding a brake light. The housing has a front face and a back face with a peripheral wall defining a periphery therebetween. The front face of the housing has a cavity therein. A brake light for signaling the braking of a motor vehicle is mounted in the well of the housing and is operatively coupled to a power source. A mounting block for mounts the housing to a rear portion of a vehicle. The mounting block has a distal wall and a proximal wall. The proximal wall of the mounting block is fixedly coupled to the back face of the housing. At least one pair of arms holds vehicle turn signals. The arms are coupled to the mounting and extend away from the mounting block. The arms extend to a point beyond the peripheral of the housing. A pair of turn signals warns of turning action of the motor vehicle. One of the turn signals is formed in the surface of each of the arms. The turn signals are operatively coupled to the power source.

In these respects, the auxiliary signal light system according to the present invention substantially departs from the conventional concepts and designs of the prior art, and in so doing provides an apparatus primarily developed for the purpose of visual enhancement of turn and brake signal lights.

SUMMARY OF THE INVENTION

In view of the foregoing disadvantages inherent in the known types of auxiliary signal lights now present in the prior art, the present invention provides a new auxiliary signal light system construction wherein the same can be utilized for visual enhancement of turn and brake signal lights.

The general purpose of the present invention, which will be described subsequently in greater detail, is to provide a new auxiliary signal light system apparatus and method which has many of the advantages of the auxiliary signal lights mentioned heretofore and many novel features that result in a new auxiliary signal light system which is not anticipated, rendered obvious, suggested, or even implied by any of the prior art auxiliary signal lights, either alone or in any combination thereof.

To attain this, the present invention generally comprises a housing for holding a brake light. The housing has a front face and a back face with a peripheral wall defining a periphery therebetween. The front face of the housing has a cavity therein. A brake light for signaling the braking of a motor vehicle is mounted in the well of the housing and is operatively coupled to a power source. A mounting block for mounts the housing to a rear portion of a vehicle. The mounting block has a distal wall and a proximal wall. The proximal wall of the mounting block is fixedly coupled to the back face of the housing. At least one pair of arms holds vehicle turn signals. The arms are coupled to the mounting and extend away from the mounting block. The arms extend to a point beyond the peripheral of the housing. A pair of turn signals warns of turning action of the motor vehicle. One of the turn signals is formed in the surface of each of the arms. The turn signals are operatively coupled to the power source.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new auxiliary signal light system apparatus and method which has many of the advantages of the auxiliary signal lights mentioned heretofore and many novel features that result in a new auxiliary signal light system which is not anticipated, rendered obvious, suggested, or even implied by any of the prior art auxiliary signal lights, either alone or in any combination thereof.

It is another object of the present invention to provide a new auxiliary signal light system which may be easily and efficiently manufactured and marketed.

It is a further object of the present invention to provide a new auxiliary signal light system which is of a durable and reliable construction.

An even further object of the present invention is to provide a new auxiliary signal light system which is susceptible of a low cost of manufacture with regard to both materials and labor, and which accordingly is then susceptible of low prices of sale to the consuming public, thereby making such auxiliary signal light system economically available to the buying public.

Still yet another object of the present invention is to provide a new auxiliary signal light system which provides in the apparatuses and methods of the prior art some of the advantages thereof, while simultaneously overcoming some of the disadvantages normally associated therewith.

Still another object of the present invention is to provide a new auxiliary signal light system for visual enhancement of turn and brake signal lights.

Yet another object of the present invention is to provide a new auxiliary signal light system which includes a housing for holding a brake light. The housing has a front face and a back face with a peripheral wall defining a periphery therebetween. The front face of the housing has a cavity therein. A brake light for signaling the braking of a motor vehicle is mounted in the well of the housing and is operatively coupled to a power source. A mounting block for mounts the housing to a rear portion of a vehicle. The mounting block has a distal wall and a proximal wall. The proximal wall of the mounting block is fixedly coupled to the back face of the housing. At least one pair of arms holds vehicle turn signals. The arms are coupled to the mounting and extend away from the mounting block. The arms extend to a point beyond the peripheral of the housing. A pair of turn signals warns of turning action of the motor vehicle. One of the turn signals is formed in the surface of each of the arms. The turn signals are operatively coupled to the power source.

Still yet another object of the present invention is to provide a new auxiliary signal light system that can be easily mounted on an existing trailer hitch.

Even still another object of the present invention is to provide a new auxiliary signal light system that provides greater safety by improving the signal light system of a motor vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
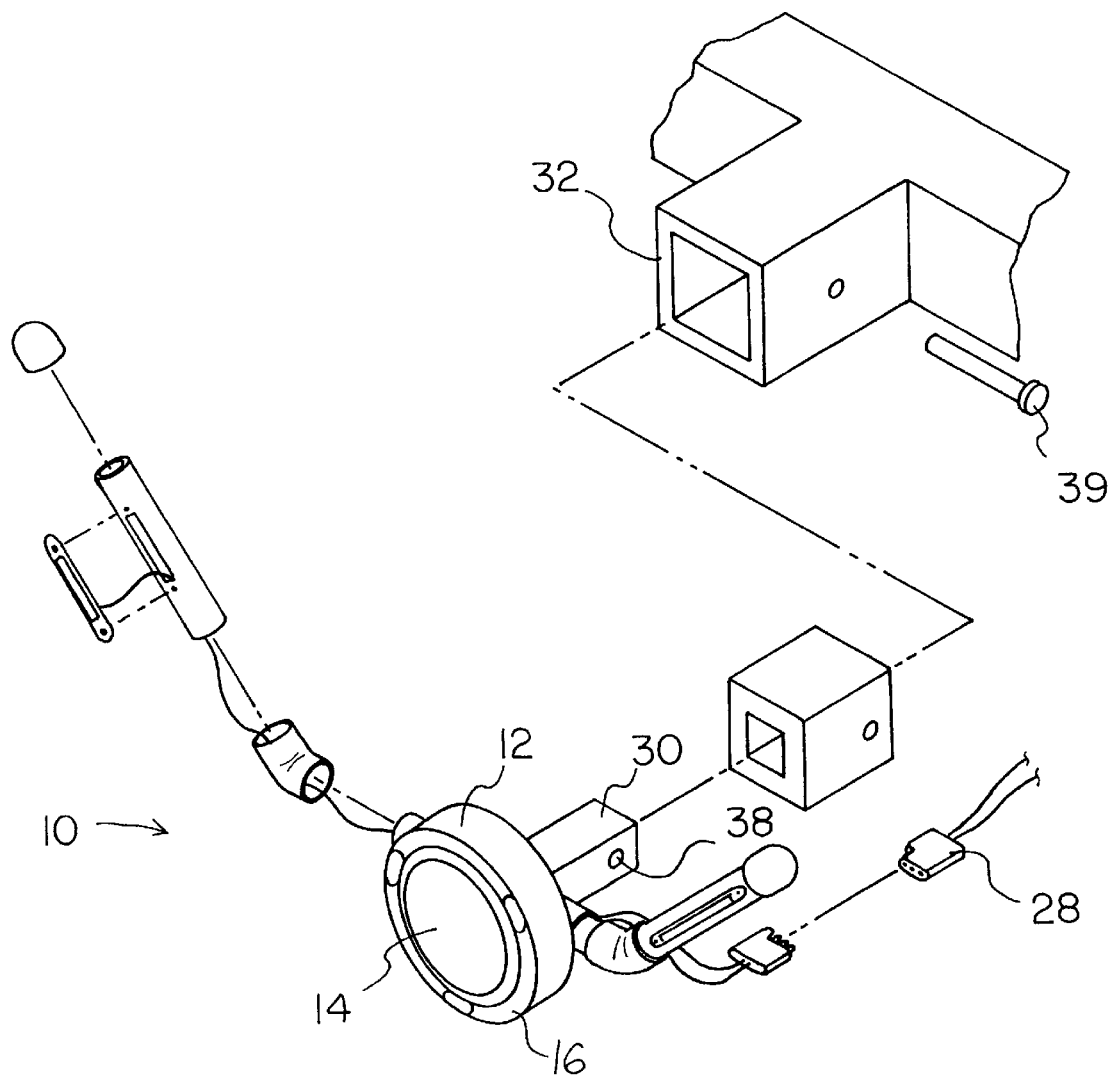
FIG. 1 is a schematic perspective view of a new auxiliary signal light system according to the present invention.
Figure 2:
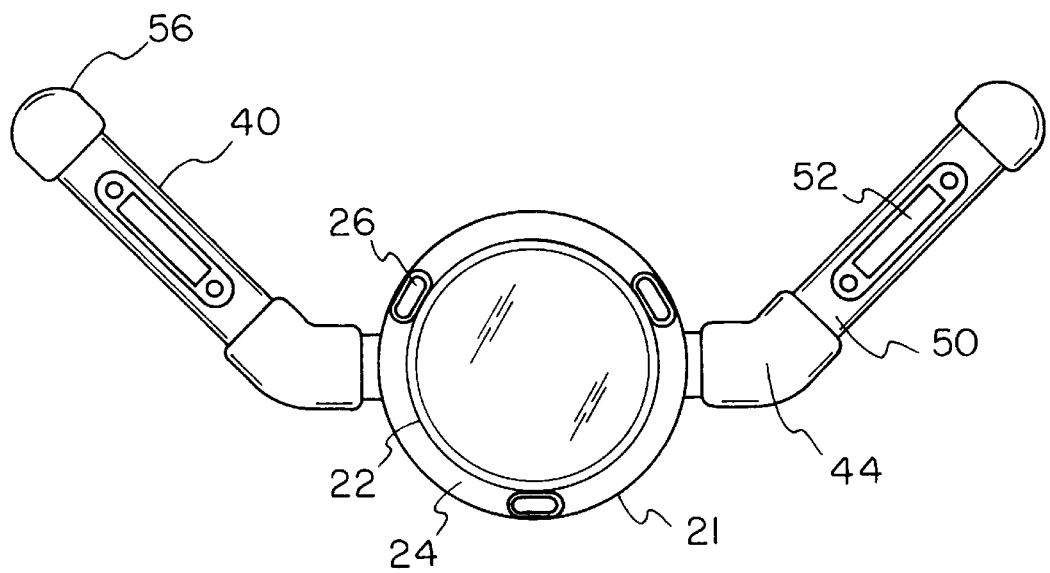
FIG. 2 is a schematic front view of the present invention.
Figure 3:
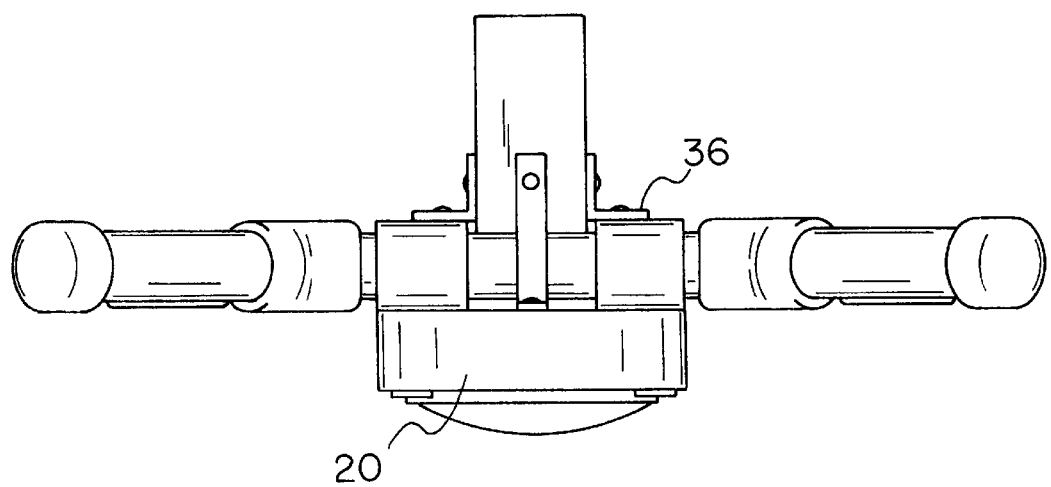
FIG. 3 is a schematic plan view of the present invention.
Figure 4:
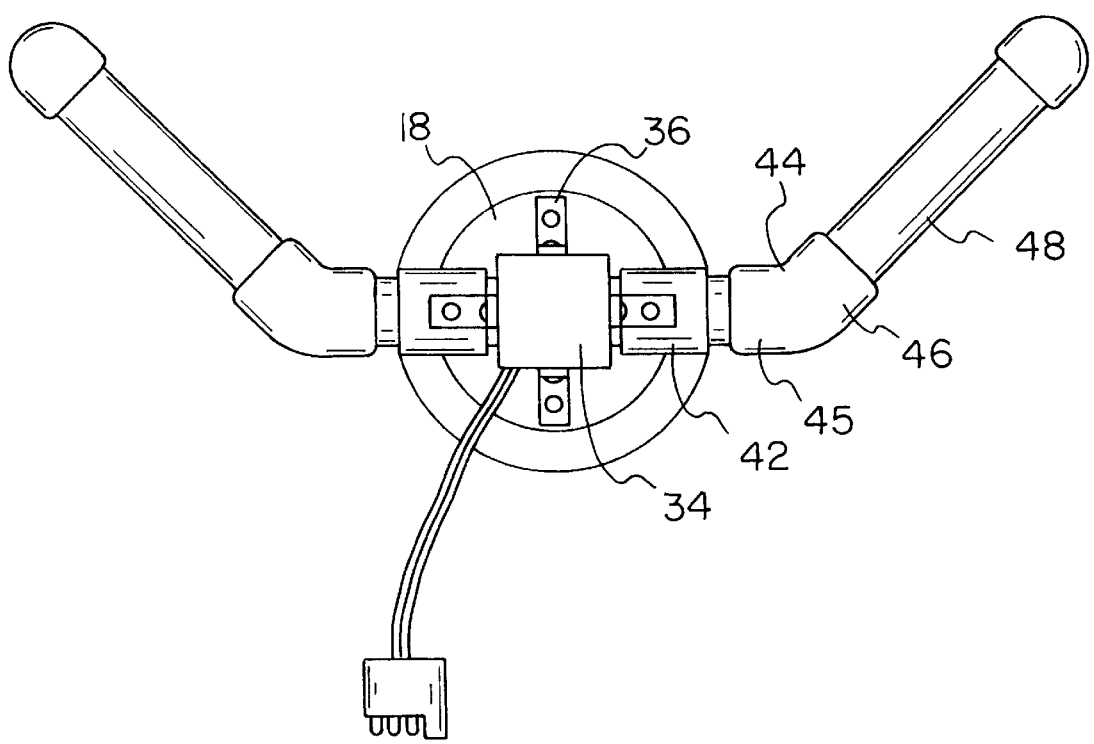
FIG. 4 is a schematic back view of the present invention.

With reference now to the drawings, and in particular to FIGS. 1 through 6 thereof, a new auxiliary signal light system embodying the principles and concepts of the present invention and generally designated by the reference numeral 10 will be described.

As best illustrated in FIGS. 1 through 6, the auxiliary signal light system 10 generally comprises a housing 12 for holding a brake light 14. The housing has a front face 16 and a back face 18 with a peripheral wall 20 defining a periphery therebetween. The housing preferably has a circular shape and the front face of the housing has a cavity therein. Preferably, the cavity has a generally circular shape.

The meeting of the front face 16 and the peripheral wall 20 of the housing define a first edge 21. A second edge 22 is defined by the meeting of the face and the cavity. An area between the first edge and the second edge defines a ledge 24 on the face 16 of the housing.

Preferably, three light reflectors 26 for reflecting light are fixedly mounted on the ledge. Preferably, the reflectors are oblong, however any shape is acceptable. Ideally, each of the reflectors is located at the vertices of an equilateral triangle formed by the longitudinal axis of each of the reflectors such that the reflectors are equidistant from each other.

A brake light 14 for signaling the braking of a motor vehicle and is preferably circular shaped. The brake light is mounted in the cavity of the housing 12. The brake light is operatively coupled to a power source 28.

A mounting block 30 is used for mounting the housing to a trailer hitch receiver 32 on a motor vehicle. The mounting block is generally rectangular. The mounting block has a distal wall 34 for insertion into the trailer hitch receiver and a proximal wall. The proximal wall of the mounting block is fixedly coupled to the back face of the housing. The mounting block may be coupled to the housing in any way known in the art, however welding or L-shaped brackets 36 are preferred.

A bore 38 for receiving a mounting pin 39 is in the mounting block. The bore is positioned nearer to the distal end 36 of the mounting block than the proximal end of the mounting block.

Figure 5:
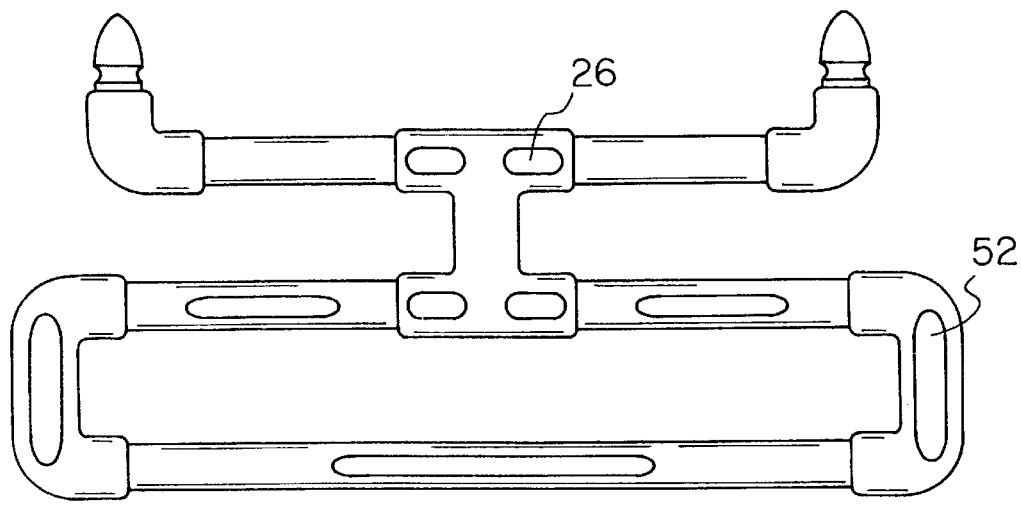
FIG. 5 is a schematic front view of another embodiment of the present invention.
Figure 6:
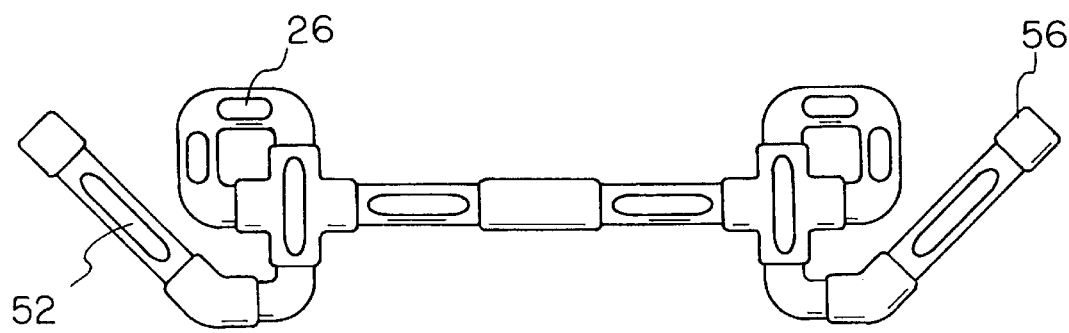
FIG. 6 is a schematic front view of another embodiment of the present invention.

Preferably, a pair of arms 40 holds vehicle turn signals. Each of the arms comprises a first cylindrical member 42. A pair of L-shaped brackets 36 preferably couples the first cylindrical member to the mounting block 30, though welding or other form of mounting could be utilized. The arms each extend away from the mounting. Ideally, the first cylindrical member 42 extends in a diametrically opposite direction to the first cylindrical member of the other of the arm and parallel to a plane defined by the back face 18 of the housing. Preferably, the first cylindrical member extends beyond the first edge 21 of the housing. A coupling elbow 44 has a first portion 45 and a second portion 46, wherein the first portion 45 of the coupling elbow is adapted to receive a portion of the first cylindrical member 42. The juncture of the first and second portions of the coupling elbow preferably defines an acute angle measuring generally between thirty degrees and sixty degrees. The first and second portions of the coupling elbow preferably lie in the plane of the back face of the housing such that each of the coupling elbows extends away from the housing. The coupling elbow 44 is hollow. A second cylindrical member 48 has a portion inserted into the second portion 46 of the coupling elbow 44. The second cylindrical member is hollow and has an outer surface 50. The arms can be fashioned into any shape, two examples of which are depicted in FIGS. 5 and 6. FIGS. 5 and 6 show only the arms and do not depict the brake light that would be mounted between the arms. Preferably, the first and second cylindrical members are made from metal and have a chrome finish.

A pair of turn signals 52 signals a turning action of the motor vehicle. One of the turn signals is formed in the surface 50 of each of the second cylindrical member 48. Each of the turn signals is operatively coupled to the power source 28. Multiple pairs of turn signals may be utilized.

Preferably, a pair of caps 56 is adapted for covering an end of the second cylindrical member.

In use, the mounting block 30 of the preferred embodiment is inserted into the receiving end 32 of a trailer hitch. The brake lights and turn signals are all operatively connected to wires, which can be connected to the signal system, which is the power supply 28, from the motor vehicle. Ideally, the brake light are operationally coupled to the head light system of the car so that turning on the headlights illuminates the brake light. Also, ideally, when the brakes of the motor vehicle are depressed, the auxiliary brake light turns off. The turning off of the brake light with the simultaneous brightening of the standard brake lights on the vehicle, will serve as an indicator that the vehicle is stopping.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An auxiliary signal light system for motor vehicles, the auxiliary signal light system includes:
   a housing for holding a brake light, said housing having a front face and a back face with a peripheral wall defining a periphery therebetween, said front face of said housing having a cavity therein;
   a brake light for signaling the braking of a motor vehicle, said brake light being mounted in said cavity of said housing, said brake light being operatively coupled to a power source;
   a mounting block for mounting said housing to a rear portion of a vehicle, said mounting block having a distal wall and a proximal wall, said proximal wall of said mounting block being fixedly coupled to said back face of said housing;
   at least one pair of arms for holding vehicle turn signals, said arms being coupled to said mounting, said arms extending away from said mounting block, said arms extending to a point beyond said peripheral of said housing;
   at least one pair of turn signals for signaling a turning action of the motor vehicle, one of said turn signals being formed in the surface of each of said arms, each of said turn signals being operatively coupled to said power source; each of said arms comprises:
      a first member, said first member being coupled to said mounting block by a pair of brackets, said first member extending in a diametrically opposite direction to the first member of the other of said arms and substantially parallel to a plane defined by the back of said housing;
      a coupling elbow, said having a first portion and a second portion, wherein said first portion of said coupling elbow is adapted to receive a portion of said first member, said coupling elbow being substantially hollow;
      a second member, said second member having a portion inserted into said second portion of said coupling elbow; and
      wherein one of said turn signals is formed in the surface of each of said second members.

2. The auxiliary signal light system for motor vehicles as in claim 1, wherein said system comprises:
   a first edge being defined by the meeting of said front face and said peripheral wall of said housing;
   a second edge defined by the meeting of said face and said cavity;
   a ledge on said face of said housing, said ledge being defined by an area between said first edge and said second edge; and
   at least one light reflector for reflecting light being projected at said reflectors, said reflector being fixedly mounted on said ledge.

3. The auxiliary light system for motor vehicles as in claim 1, further comprising:
   said mounting block being adapted for mounted to a trailer hitch receiver on a motor vehicle, said mounting block being generally rectangular, said mounting block having a distal wall being adapted for insertion into said trailer hitch receiver;
   a bore for receiving a mounting pin, said bore being in said mounting block.

4. The auxiliary signal light system for motor vehicles as in claim 1, wherein said brake light is actuated by turning on a headlight system of said motor vehicle, wherein depressing of said brakes causes said brake tight to turn off.

5. An auxiliary signal light system for motor vehicles, the auxiliary signal light system includes:
   a housing for holding a brake light, said housing having a front face and a back face with a peripheral wall defining a periphery therebetween, said housing having a generally circular shape, said front face of said housing having a cavity therein, said cavity having a generally circular shape;
   a first edge being defined by the meeting of said front face and said peripheral wall of said housing;
   a second edge defined by the meeting of said face and said cavity;
   a ledge on said face of said housing, said ledge being defined by an area between said first edge and said second edge;
   three light reflectors for reflecting light being projected at said reflectors, each of said reflectors being oblong, each of said reflectors being fixedly mounted on said ledge, each of said reflectors being located at the vertices of an equilateral triangle formed by the longitudinal axis of each of said reflectors such that said reflectors are equidistant from each other;

a brake light for signaling the braking of a motor vehicle, said brake light being generally circular shaped, said brake light being mounted in said cavity of said housing, said brake light being operatively coupled to a power source;

a mounting block for mounting said housing to a trailer hitch receiver on a motor vehicle, said mounting block being generally rectangular, said mounting block having a distal wall for insertion into said trailer hitch receiver and a proximal wall, said proximal wall of said mounting block being fixedly coupled to said back face of said housing;

a bore for receiving a mounting pin, said bore being in said mounting block, said bore being positioned nearer to said distal end of said mounting block than said proximal end of said mounting block;

a pair of arms for holding vehicle turn signals, each of said arms comprising:

a first cylindrical member, said of cylindrical member being coupled to said mounting block by a pair of L-shaped brackets, said first cylindrical member extending in a diametrically opposite direction to the first cylindrical member of the other of said arms and parallel to a plane defined by the back of said housing, wherein said first cylindrical member extend beyond said first edge of said housing;

a coupling elbow, said elbow having a first portion and a second portion, wherein said first portion of said coupling elbow is adapted to receive a portion of said first cylindrical member, wherein the juncture of said first and second portions of said coupling elbow defines an acute angle measuring generally between thirty degrees and sixty degrees, said first and second portions of said coupling elbow lying in said plane of said back of said housing such that each of said coupling elbows extending away from said housing, said coupling elbow being hollow;

a second cylindrical member, said second cylindrical member having a portion inserted into said second portion of said coupling elbow, said second cylindrical member being hollow, said second cylindrical member having an outer surface;

a pair of turn signals for signaling a turning action of the motor vehicle, one of said turn signals being formed in the surface of each of said second cylindrical member, each of said turn signals being operatively coupled to said power source;

a pair of caps, each cap being adapted for covering an end of said second cylindrical member.

* * * * *